Patented Feb. 26, 1935

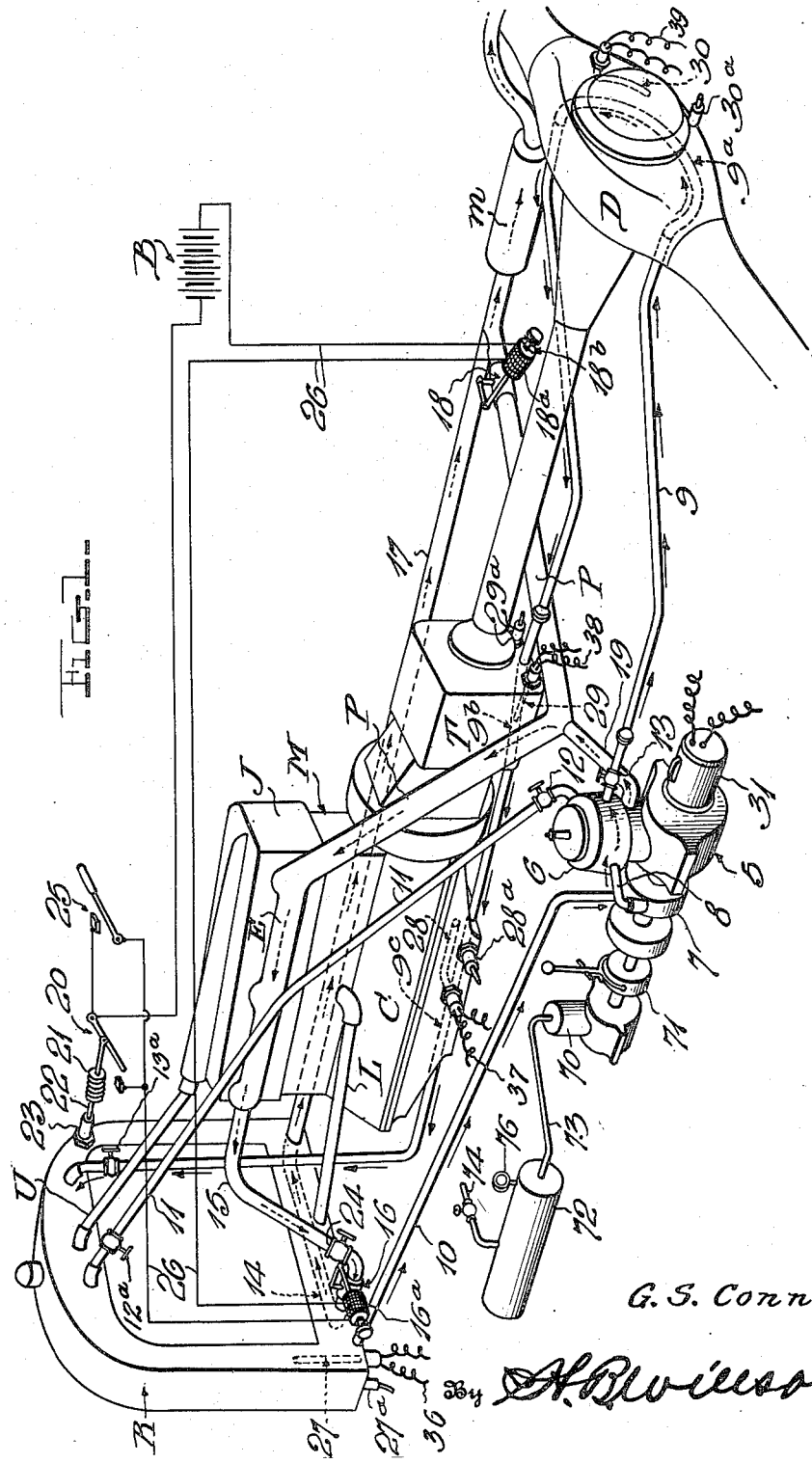

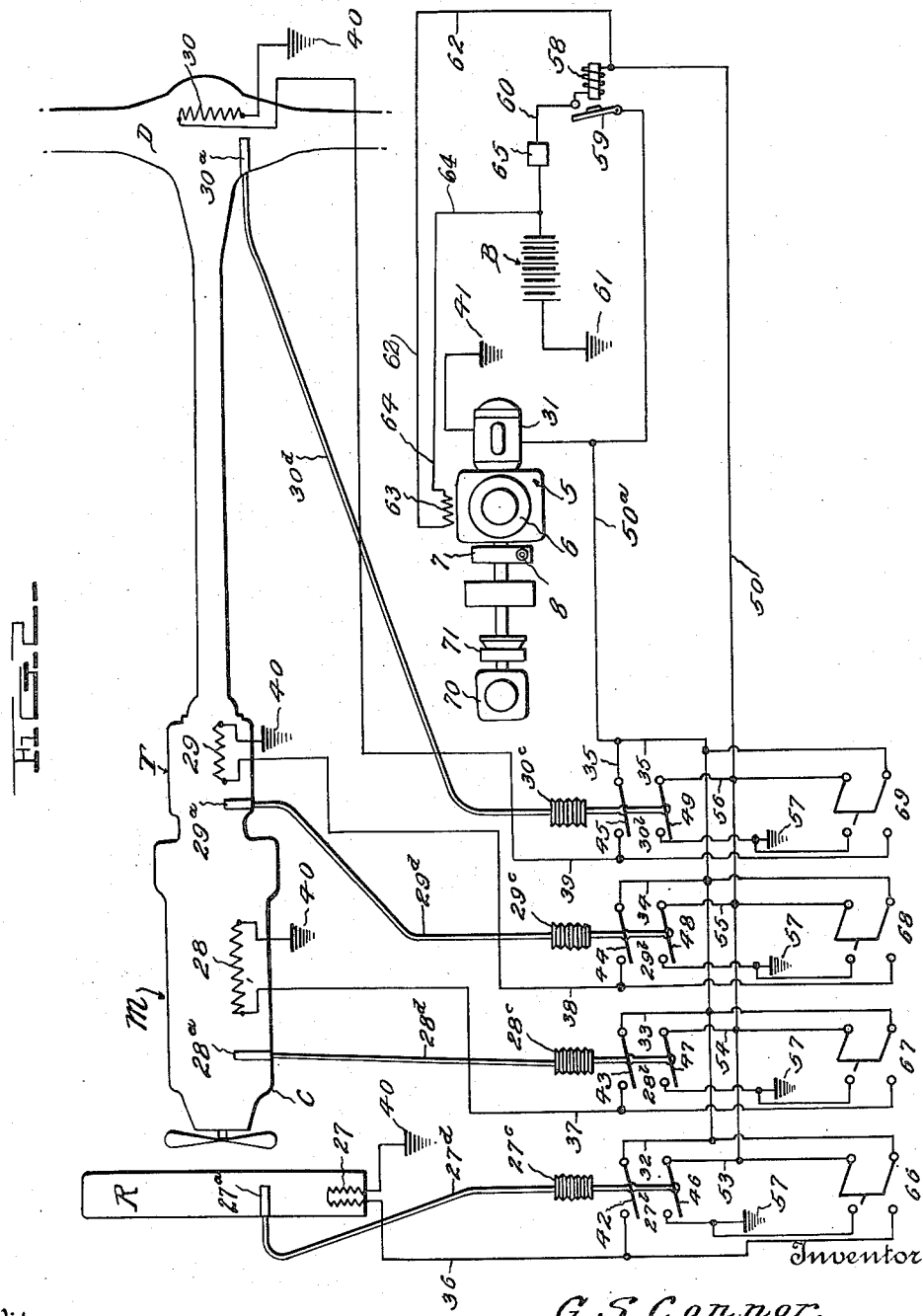

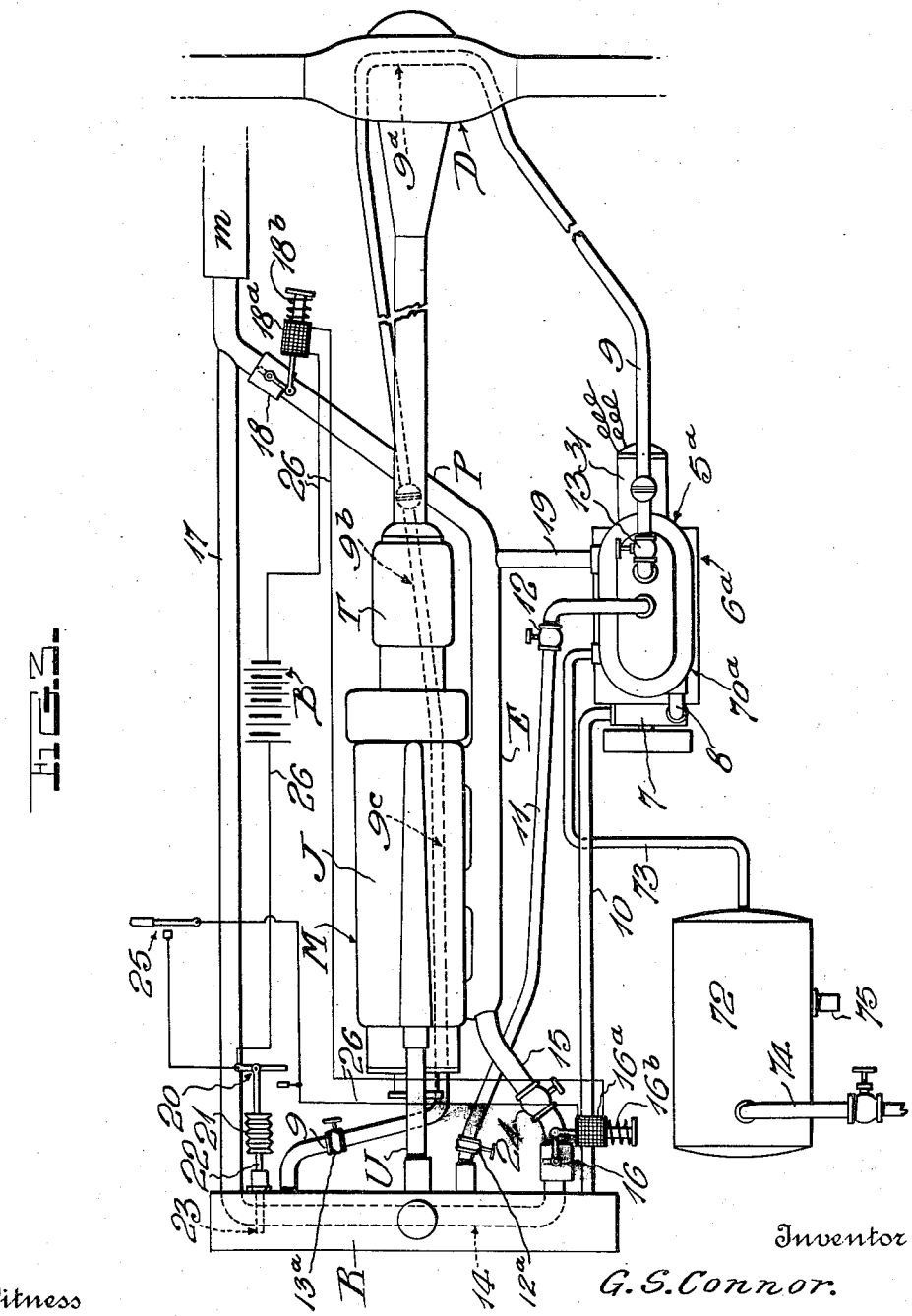

1,992,568

UNITED STATES PATENT OFFICE 1,992,568

AUXILIARY ENERGY PLANT FOR MOTOR DRIVEN VEHICLES

George S. Connor, New York, N. Y., assignor of thirty per cent to Fred W. Payne and fifteen per cent to Clarence H. Benham, both of New York, N. Y.

Application June 12, 1933, Serial No. 675,510

4 Claims. (Cl. 290—2)

The invention relates to a motor driven vehicle (land, air or water) equipped with an auxiliary internal combustion engine (air or water-cooled) and a generator driven by said auxiliary engine.

The principal object of the invention is to provide electric heaters for a plurality of zones of the vehicle supplied with current from the above-mentioned generator, means for automatically starting said auxiliary engine to operate said generator and feed the heaters whenever any of said zones requires heat, means for cutting out the heater of any zone when no further heat is required therein, and means for stopping the auxiliary engine only when the last zone to require heat, has been heated.

A further object is to provide novel means including a magnetically operated thermostatically controlled valve whereby a hot fluid supplied by the auxiliary engine, is directed through a heating conduit for a part of the vehicle whenever such part requires heat, said heating fluid being otherwise directed along another course.

The invention is designed primarily to prevent freezing of the engine cooling system without the necessity of using any anti-freeze solution therein, and to prevent congelation of lubricant to insure easy starting and effective lubrication even at extremely low temperatures. However, heating of other zones of the vehicle may be effected if desired and the generator is preferably of such capacity as to not only furnish the current needed for heating purposes, but to supply current also for any electrical accessories which it may be desired to use.

The disclosure of the invention herein given makes no attempt to illustrate all of its possibilities but it is sufficiently full and clear to enable those skilled in the art to practice the invention, and it is to be understood that the disclosure is illustrative rather than limiting.

Fig. 1 is a general perspective view, the heater circuits, the starter circuit for the auxiliary engine, the ignition circuit for said auxiliary engine and the battery charging circuit being omitted.

Fig. 2 is a diagrammatic plan view showing the circuits omitted from Fig. 1 and illustrating also the thermostatic controlling means for these circuits.

Fig. 3 is a diagrammatic top plan view showing a modification in which the air compressor is constructed as a single unit with the auxiliary engine.

In the drawings above briefly described which may be considered as showing the invention in connection with an automobile or any other motor driven vehicle, I have illustrated the vehicle driving motor M having a water jacket J, crank case C and exhaust manifold E. R denotes a conventional radiator connected by upper and lower pipes U and L with the jacket J to establish a cooling system for the motor, and while this system is shown only of the thermo-siphon type, it could of course well embody a pump if desired. Leading from the exhaust manifold E is an exhaust pipe P which commonly extends to a muffler m.

T denotes a conventional transmission driven by the motor M, and operatively connected with a differential D or other power transmitting means.

B denotes the conventional battery which performs the customary functions of supplying current for self-starter, ignition, lights, signals, etc., it being understood that the usual generator driven by the motor M feeds current to said battery. Heretofore, however, due to cold motors and cold oil in the crank cases thereof, the battery B has been severely over-taxed in cold weather. This is also true where attempts have been made to connect electrical heaters and other electrical contrivances with the battery, but due to one feature of my invention, the battery will be kept fully charged and may hence supply current for a number of uses to which it is not now ordinarily adapted.

Suitably mounted at any preferred location upon the vehicle, is an auxiliary internal combustion engine 5 (Figs. 1 and 2) or 5a (Fig. 3). This small auxiliary engine is provided with a water jacket 6 (Figs. 1 and 2) or 6a (Fig. 3). 7 denotes a water pump driven by the auxiliary engine, the outlet of said pump being connected by a water conductor 8 with a lower portion of the jacket 6 or 6a. A hot water conducting pipe 9 extends from an upper portion of the jacket 6 or 6a and is provided with one portion 9a extending through the differential D, with another portion 9b extending through the transmission T, and with a third portion 9c which passes through the crank case C, said pipe 9 leading to the upper header of the radiator R. A water return pipe 10 leads from the lower header of this radiator to the inlet of the pump 7. It will thus be seen that when the auxiliary engine 5 or 5a is being driven, the water heated in its jacket 6 or 6a will circulate through the pipe 9, radiator R and pipe 10. Therefore, the portions 9a, 9b, and 9c of the pipe 9 serve to heat the lubricant in the differential D, transmission T and crank case C, to prevent it from congealing. At the same time, the hot water circulating through the radiator R will raise the temperature of the water in the cooling system of the vehicle driving motor M, tending to prevent freezing and assisting in raising the motor temperature to that most desired for efficient operation.

Another pipe 11 extends from an upper portion of the jacket 6 or 6a to the upper header of the radiator R. This pipe is provided with a cut-off valve 12, and the pipe 9 is equipped with a similar valve 13. Valve 12 is closed when circulation for lubricant heating is desired, valve 13 being then opened. When valve 13 is closed however, the hot water from the jacket 6 or 6$^a$ will reach the radiator R through the pipe 11 and will return through the pipe 10.

A heating conduit 14 is provided in any desired portion of the motor cooling system, that is the cooling system for the motor M. In the present showing, conduit 14 passes through the lower header of the radiator R. Leading to one end of this conduit, from the exhaust manifold E, is a pipe 15 having a valve 16. Leading from the other end of the conduit 14 and joining the exhaust pipe P, is another pipe 17, and at an appropriate point between this pipe 17 and the manifold E, said pipe P is provided with a valve 18. When valve 18 is open, valve 16 stands closed and the exhaust gases from the motor M will then discharge in the usual way to the atmosphere. The exhaust gases from the auxiliary engine 5 or 5$^a$ will also discharge in this same manner, due to an exhaust pipe 19 connecting said auxiliary engine with the pipe P. However, when valve 18 is closed and valve 16 is opened, the exhaust gases from both the motor M and the auxiliary engine 5 will take the course indicated by the arrows in Fig. 1, so that all of the exhaust gas travels through the conduit 14, for heating the water in the radiator R and consequently raising the temperature of the water in the entire cooling system of the motor M.

Solenoids or the like 16$^a$ and 18$^a$ are provided, in the present showing, to operate the valves 16 and 18 respectively in one direction, and springs 16$^b$ and 18$^b$ are provided to move said valves in the other direction. When both solenoids are de-energized, valve 16 stands closed and valve 18 stands in open position, so that the exhaust gases will not pass through the conduit 14. When the solenoids are energized however, they reverse the relative settings of the valves 16 and 18, so as to direct the exhaust gases through the conduit 14. Energizing and de-energizing of these solenoids is preferably effected by a thermostatically controlled switch, which is preferably of quick-make and quick-break nature. The switch is diagrammatically illustrated at 20, as provided with an operating bellows 21. This bellows is connected by a tube 22 with a sensitive element 23 in the radiator R or some other part of the motor-cooling system, said tube, element and bellows being filled with a liquid which will expand under temperature rise and contract under decreasing temperature. Whenever the temperature in the cooling system drops below a predetermined point, switch 20 automatically closes, positioning the valves 16 and 18 to route the exhaust gases through the conduit 14. Whenever the temperature of the water in the cooling system has been raised to the required extent, switch 20 automatically opens and the valves 16 and 18 return to their normal settings so that the exhaust gases will not pass through conduit 14.

If desired, a cut-off valve 24 may be provided in the pipe 15 to be closed during the summer months but not otherwise.

A hand switch is shown at 25 establishing a manual control for the circuit of the solenoids 16$^a$ and 18$^a$, independent of the switch 20. Both of the switches 20 and 25 are operatively connected by appropriate wiring 26 with the battery B.

Suitable electric heaters are provided for various parts of the machine. One is shown at 27 for the motor cooling system, preferably although not necessarily located in the radiator R; another is shown at 28 for the crank case C, a third at 29 for the transmission T, and a fourth at 30 for the differential D. All of these heaters are supplied with current by means of an electric generator 31 driven by the auxiliary engine 5 or 5$^a$, and thermostats 27$^a$, 28$^a$, 29$^a$ and 30$^a$ are provided for said heaters respectively, to cut any one out of play when its use is no longer required, and to cut any one into play whenever its use is advisable. These same thermostats control starting and stopping of the auxiliary engine 5 or 5$^a$, as will hereinafter appear.

Two pole quick-make and quick-break switch units are provided for the electric heater circuits and for establishing a circuit to start the auxiliary engine 5 or 5$^a$, this engine being provided with a starting motor. In the present showing, 31 denotes a starter-generator which when energized from the battery B, acts as a starting motor for the auxiliary engine 5 or 5$^a$ and thereafter acts as a generator to charge said battery B. The switch unit in question is denoted diagrammatically at 27$^b$, 28$^b$, 29$^b$ and 30$^b$ in Fig. 2. They are provided with operating bellows 27$^c$, 28$^c$, 29$^c$ and 30$^c$ connected by tubing 27$^d$, 28$^d$, 29$^d$ and 30$^d$, with the sensitive elements or thermostats 27$^a$, 28$^a$, 29$^a$ and 30$^a$, above described, said sensitive elements, tubes and bellows being filled with an incompressible liquid which expands under temperature rise and contracts under temperature fall. Whenever any of the zones in which the sensitive elements 27$^a$, 28$^a$, 29$^a$ and 30$^a$ are located, requires heat, the associated switch unit 27$^b$, 28$^b$, 29$^b$ or 30$^b$ automatically closes. This establishes a starting circuit from the battery B through the starter-generator 31, and completes the ignition circuit of the auxiliary engine 5 or 5$^a$, so that this engine will be immediately started. The switch unit also completes a circuit from the member 31 which now acts as a generator, through the electric heater 27, 28, 29 or 30, whose associated sensitive element has effected switch closing. The current generated by operation of the auxiliary engine 5 or 5$^a$ thus supplies any zone or zones requiring heat, with the requisite heat, and as soon as the proper temperature has been reached, the sensitive element associated with any heater, opens the switch of this heater and if at that time no other heater circuit is complete, also breaks the ignition circuit of the engine 5 or 5$^a$ so that the latter will stop. However, if at the time any sensitive element effects opening of the associated switch unit, any other zones to be heated, still require the operation of their respective electric heaters, the sensitive elements associated with these heaters will insure that their circuits shall be maintained and that the auxiliary engine 5 or 5$^a$ shall continue to operate. The last sensitive element to effect opening of its respective switch unit, breaks the ignition circuit of the auxiliary engine and the latter comes to rest.

50$^a$ denotes a lead wire from the starter-generator 31, said lead wire having branches 32, 33, 34 and 35 leading to one blade of the switches 27$^b$, 28$^b$, 29$^b$ and 30$^b$ respectively. Leading from the contacts which co-operate with these blades, are wires 36, 37, 38 and 39 which extend to the heaters 27, 28, 29 and 30 respectively. The other side of each of these heaters is grounded as denoted at 40 and the starter-generator is grounded at 41. The switch blades above mentioned are shown at 42, 43, 44 and 45 respectively, and it will be seen that these blades which are controlled by the sensitive elements 27ᵃ, 28ᵃ, 29ᵃ and 30ᵃ respectively, perform the functions of controlling the supply of current to the heaters 27, 28, 29 and 30 respectively. Operable simultaneously with the blades 42, 43, 44 and 45 respectively, however, are other blades 46, 47, 48 and 49 which control the starting and ignition circuits for bringing the auxiliary engine 5 or 5ᵃ into operation. A wire 50 is provided with branches 53, 54, 55 and 56 connected with the blades 46, 47, 48 and 49 respectively, and the contacts which co-act with these blades are grounded as denoted at 57. The wire 50 leads from the operating coil 58 of a relay 59, and conducting means 60 leads to said coil from one terminal of the battery B, the other terminal of this battery being grounded at 61. A shunt wire 62 leads from wire 50 and is connected with one end of the primary winding of an ignition coil 63 for the auxiliary engine 5 or 5ᵃ, the other end of the coil being connected by a wire 64 with the conducting means 60.

When any of the switch blades 46, 47, 48, 49 is closed, it completes a circuit through the relay coil 58, closing said relay and causing it to complete an operating circuit through the battery B and starter-generator 31. At the same time, the ignition circuit for the auxiliary engine 5 or 5ᵃ is completed, with the result that said auxiliary engine will be caused to operate under its own power. As soon as such operation takes place, the current output from the starter-generator 31, charges the battery B and also feeds any electric heater whose circuit may be at that time closed.

65 in Fig. 2 merely illustrates a protective device to prevent injury to the battery B by preventing overcharging thereof.

66, 67, 68 and 69 merely denote two-pole hand switches connected by appropriate conductors with the conductors 50ᵃ and 50 to effect hand-operation of parts if desired. These switches when closed or opened, perform the same functions as those performed by automatic closing or opening of the switch units 27ᵇ, 28ᵇ, 29ᵇ and 30ᵇ.

It will be seen from the above that I have provided for making use of the explosively operated auxiliary means 5—31 or 5ᵃ—31, for heating in three different ways, that is, by exhaust gases, hot water circulation, and electricity. I also prefer that an air compressor shall be driven by the engine 5 or 5ᵃ to supply compressed air for various purposes. In Figs. 1 and 2, an air compressor is shown at 70 controlled by an appropriate clutch 71, said air compressor being a separate unit from the auxiliary engine 5. In Fig. 3 however, the air compressor 70ᵃ and the auxiliary engine 5ᵃ are constructed as a single unit, and the water jacket 6ᵃ may cool both of these units. Regardless of which type of air compressor is used, the compressed air may be stored in a suitable tank 72 to which it is forced from the compressor through a pipe 73. 74 denotes a valved discharge line from the tank and 75 (Fig. 3) has reference to a safety blow-off. If at any time, the pressure in tank 72 reaches the predetermined maximum, with engine 5ᵃ and compressor 70ᵃ continuing to operate, the excess pressure blows off through 75. By observing a pressure gauge 76 which may be at any desirable location, the clutch 71 may be thrown out when required pressure has been attained, when using the construction shown in Figs. 1 and 2.

It will be seen from the foregoing that novel and advantageous provision has been made for obtaining the desired results, and while the general arrangement shown and described may be employed if desired, numerous variations may, of course, be made within the scope of the invention as claimed.

The foregoing description refers to but one valve 13 for the pipe 9 and one valve 12 for the pipe 11, but it may be advisable to provide these pipes with other valves 13ᵃ and 12ᵃ respectively, positioned near the radiator R, so that when no hot water is desired in these pipes, these additional valves also may be closed.

What is claimed is:

1. In combination with a motor driven vehicle; an electric heater and a heating conduit for a part of said vehicle, a generator for supplying current to said electric heater, an auxiliary internal combustion engine for driving said generator and supplying a hot fluid to said conduit, valve means for either allowing or preventing passage of said hot fluid to said conduit, and electro-magnetic operating means for said valve means supplied with current from said generator, said electro-magnetic operating means having a thermostatically controlled switch.

2. In combination with a motor driven vehicle having a heating conduit, an auxiliary internal combustion engine for supplying a hot fluid to said conduit, valve means for admitting the hot fluid to or preventing its admission to said conduit, electro-magnetic operating means for said valve means, a generator for supplying current to operate said electro-magnetic means, and a thermostatically controlled switch for controlling the passage of current to said electro-magnetic means.

3. In combination with a motor driven vehicle, a plurality of electric heaters for different zones of said vehicle, a generator for supplying current to operate said heaters, an internal combustion engine for driving said generator, and thermostatic switch means for automatically starting said engine when any zone requires heat, for cutting out the heater of any zone when required temperature has been attained therein, and for stopping said engine only when all of said zones have attained required temperature.

4. In combination with a motor driven vehicle, a plurality of electric heaters for different zones of said vehicle, a generator for supplying current for said heaters, a normally idle electrically started internal combustion engine for driving said generator, and engine and heater controlling circuits including normally open thermostatic switch units allotted one unit to each of said zones, any of said thermostatic switch units being constructed to close and complete the heater circuit of its respective zone and simultaneously start said engine when said zone requires heat and being adapted to open when the desired temperature has been attained in said zone, all of said thermostatic switch units being independent of each other to prevent the opening of the switch unit of any zone from stopping said engine if another zone still requires heat.

GEORGE S. CONNOR.